United States Patent
Rippel et al.

(10) Patent No.: US 6,954,010 B2
(45) Date of Patent: Oct. 11, 2005

(54) LAMINATION COOLING SYSTEM

(75) Inventors: Wally E. Rippel, Altadena, CA (US);
Daryl M. Kobayashi, Monrovia, CA (US)

(73) Assignee: Aerovironment, Inc., Monrovia, CA (US)

( * ) Notice: Subject to any disclaimer, the term of this patent is extended or adjusted under 35 U.S.C. 154(b) by 144 days.

(21) Appl. No.: 10/431,324

(22) Filed: May 6, 2003

(65) Prior Publication Data

US 2004/0012294 A1 Jan. 22, 2004

Related U.S. Application Data

(60) Provisional application No. 60/378,276, filed on May 6, 2002.

(51) Int. Cl.[7] .................................................. H02K 9/00
(52) U.S. Cl. ........................ 310/60 A; 310/57; 310/216; 310/54
(58) Field of Search ...................... 310/52–64, 216–218

(56) References Cited

U.S. PATENT DOCUMENTS

| | | | | |
|---|---|---|---|---|
| 3,835,339 A | * | 9/1974 | Laronze | 310/13 |
| 4,001,617 A | * | 1/1977 | Boyer | 310/52 |
| 4,691,131 A |   | 9/1987 | Nakano | 310/54 |
| 4,745,314 A | * | 5/1988 | Nakano | 310/57 |
| 5,173,629 A | * | 12/1992 | Peters | 310/216 |

FOREIGN PATENT DOCUMENTS

DE  197 16 759 A1  10/1998  ............ H02K/1/20

* cited by examiner

*Primary Examiner*—Dang Le
(74) *Attorney, Agent, or Firm*—Law Office of John A. Griecci

(57) ABSTRACT

An electric motor, transformer or inductor having a lamination cooling system including a stack of laminations, each defining a plurality of apertures at least partially coincident with apertures of adjacent laminations. The apertures define a plurality of cooling-fluid passageways through the lamination stack, and gaps between the adjacent laminations are sealed to prevent a liquid cooling fluid in the passageways from escaping between the laminations. The gaps are sealed by injecting a heat-cured sealant into the passageways, expelling excess sealant, and heat-curing the lamination stack. The apertures of each lamination can be coincident with the same-sized apertures of adjacent laminations to form straight passageways, or they can vary in size, shape and/or position to form non-axial passageways, angled passageways, bidirectional passageways, and manifold sections of passageways that connect a plurality of different passageway sections. Manifold members adjoin opposite ends of the lamination stack, and each is configured with one or more cavities to act as a manifold to adjacent passageway ends. Complex manifold arrangements can create bidirectional flow in a variety of patterns.

19 Claims, 7 Drawing Sheets

LAMINATION COOLING SYSTEM

This application claims priority from U.S. provisional patent application 60/378,276, filed May 6, 2002, which is incorporated herein by reference for all purposes.

This invention was made with Government support under grant DE-FG03-00ER829-40 awarded by the Department of Energy. The Government has certain rights in this invention.

BACKGROUND

This invention relates generally to methods and apparatus for cooling lamination stacks, and, more particularly, to apparatus and methods for cooling electric motors for use in electric and hybrid vehicles.

Present day electric and hybrid vehicles typically use inverter-driven, radial gap motors that are either AC induction or DC brushless type motors. Both of these motor types are similar in that an interior rotor rotates within an exterior stator. The stator can be made of a lamination stack (i.e., a stack of planar laminations) supporting windings in a conventional arrangement. In forming the lamination stack, the laminations a thermally activated bonding agent is applied to the laminations, and then the laminations are compressed together and heated.

During operation of the motors, heat primarily flows radially outward, with heat produced within the rotor being transferred through an air gap to the stator. Heat from the stator is in turn transferred to an outer housing that is typically composed of aluminum. In some applications the housing is air-cooled. For other air-cooled alternatives, it is known to pass air through passageways formed radially or axially between laminations. In other applications, the housing includes channels through which a liquid coolant is directed. This latter approach, using a "liquid-cooled housing," is generally favored over air-cooled schemes because it provides improved heat transfer while allowing reduced overall dimensions.

Liquid-cooled housings typically must be a complex "investment casting." The housing inner diameter ("ID") and stator outer diameter ("OD") typically must each be turned or ground to precision dimensions so that an accurate interference fit can be achieved between the two to provide for efficient heat transfer between the stator and the housing. Thermal grease is often added to the stator at its OD prior to installation into the housing to provide for optimal heat transfer between the stator and the housing. To facilitate installation of the stator into the housing, it is often necessary to cool the stator and/or heat the housing prior to assembly. Each of these aspects adds to the expense of manufacturing a liquid cooled housing. A liquid-cooled housing will typically have small gaps between the stator and housing, causing increased thermal impedance between them, thereby reducing the continuous power rating of the motor. Furthermore, the housing add size and weight to the stator and rotor.

In an alternative cooling scheme, it is known to submerge a lamination stack in a liquid coolant bath, and to provide passageways through the laminations for coolant to convectively flow.

It is desirable for a motor to be cooled, preferably with an efficiency as great as or better than by a liquid cooled housing, with a minimum of additional size and weight (i.e., mass) over that required for the stator and rotor. Further, it is desirable to minimize the total cost of manufacturing such a motor cooling system. Various embodiments of the present invention can meet some or all of these needs, and provide further, related advantages.

SUMMARY OF THE INVENTION

In various embodiments, the present invention mitigates some or all of the needs mentioned above, providing cooling apparatus scheme for use with electric motors, or similar devices such as transformers, inductors, generators and the like. This cooling apparatus typically mitigates the above-described problems while offering improved heat transfer efficiency, reduced overall apparatus size, and/or reduced apparatus mass.

Embodiments of the invention typically include a lamination cooling system having a lamination stack including a plurality of laminations. Each lamination defines one or more apertures, and the apertures of each lamination are at least partially coincident with the apertures of adjacent laminations in the lamination stack. Thus, the apertures define cooling-fluid passageways through the lamination stack.

A feature of the invention is that gaps between the adjacent laminations are sealed to prevent a liquid cooling fluid in the passageways from exiting the lamination stack between adjacent laminations. This feature will generally provide for both the heat capacity advantages of a liquid cooling system and the structural advantages of the direct stator cooling that can be found in some air-cooled systems. Furthermore, these advantages are available without the large weight and container requirements of systems having an entire stator maintained in a coolant bath. In short, this feature provides for efficient cooling, with efficient size, weight and cost requirements.

In another feature of the invention, the seal between the laminations is preferably formed by applying sealant to the surfaces of the cooling-fluid passageways. The sealant is preferably of a material that can be solidified to nonporously coat the passageways, and of a type that will not be degraded by the cooling fluid. The sealant is preferably applied by flooding the passageways, preferably with the sealant under adequate hydrostatic pressure to inject the sealant into any voids between the laminations that could allow coolant to leak from the passageways and/or out of the lamination stack. The flooded sealant is then substantially drained (i.e., drained except for the portion of the sealant that entered voids and/or stuck to the passageway walls as a coating), and the removal of the excess (i.e., removable) sealant is aided by passing air through the passageways. Air pressure can be used to force the sealant into the voids, either in addition to or as an alternative to using hydrostatic pressure. Finally, the sealant is preferably cured by subjecting it to an appropriate temperature cycle. Advantageously, this feature generally provides not only for the advantages described above for the first feature, but also for the prevention of corrosion caused by the cooling fluid.

Another feature of some embodiments of the invention is that passageways can be designed to increase and decrease in size, and to curve, turn, subdivide, and even loop back, so as to offer control over the extent and location of the cooling. This feature can advantageously provide for control over stresses and degradation related to high temperatures and/or high temperature gradients, as well as provide for cooling of lamination locations that are not axially accessible through a lamination stack.

Yet another feature of some embodiments of the invention is that cooling-fluid manifolds can be used both to control fluid flow between input/output sources and various passageways, and to structurally support the lamination stack. This feature can advantageously provide for the use of cooling-fluid serially flowing through a plurality of passageways to provide bidirectional flow, potentially allowing for better temperature gradient control and larger passageway dimensions (and accordingly reduced material weight and manufacturing cost). This feature also allows for the lamination stack to be supported within a framework of tie rods and end bells that both support rotor bearings and support the manifolds. Furthermore, when combined with the second recited feature above, the cooing-fluid-containing interior of the manifolds can also be sealed and coated with sealant for the prevention of leaks and corrosion.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

Figure 1:
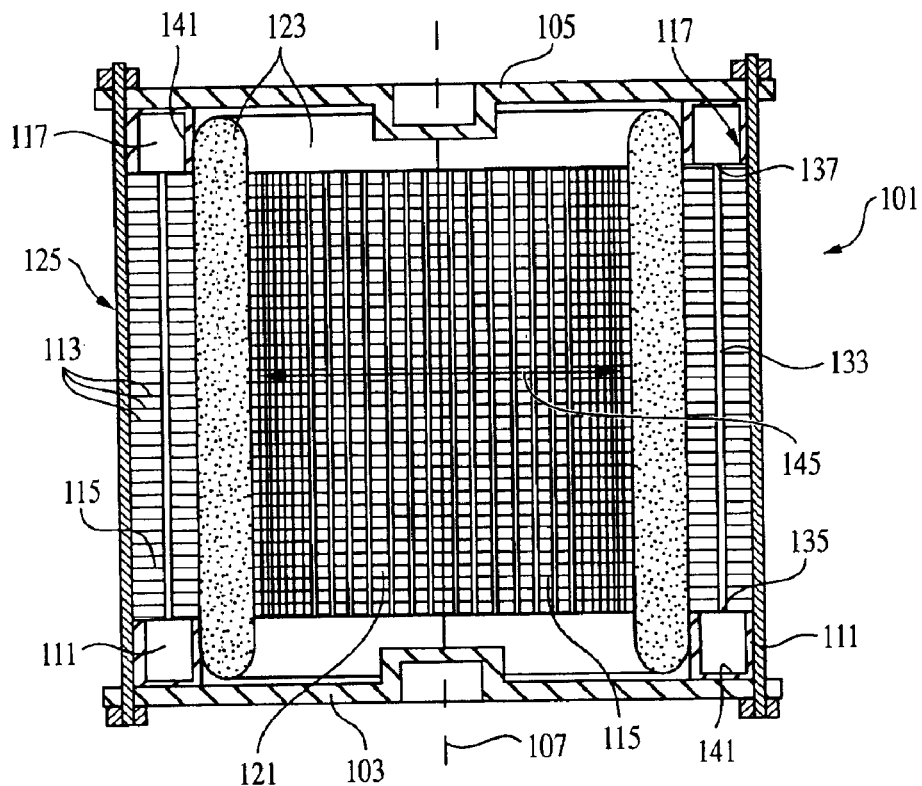
FIG. 1 is a cross-sectional plan view of a stator embodying the invention.

The present invention provides a lamination cooling system, such as for use in a motor, and related methods of making and operating such devices. The present invention further provides motors, transformers, inductors and the like, as formed with the lamination cooling system of the invention. Features and advantages of the invention will become apparent from the following detailed description of the preferred embodiments, taken in conjunction with the accompanying drawings, which illustrate, by way of example, the principles of the invention.

With reference to FIGS. 1, 2, 3A and 3B, a preferred embodiment of the motor includes a generally cylindrical stator 101 and a preferably conventional rotor (not shown). The rotor extends axially between a generally disk-shaped first end bell 103 and a generally disk-shaped second end bell 105 of the stator, with bearings mounted such that the rotor can rotate along an axis 107 extending between the two end bells.

Nested within the end bells 103 and 105, the stator 101 also includes a generally annular first manifold member 111, a plurality of generally annular laminations 113 forming a lamination stack 115, and a generally annular second manifold member 117. Each lamination (such as the one depicted in FIG. 2) is preferably planar, having a plurality of winding teeth 121 defining winding slots. The laminations are stacked coaxially along the axis 107 with their teeth aligned to form supports for windings 123 within the slots. The windings supported on the laminations are of a conventional configuration. A plurality of tie rods 125 extend between the two end bells, and hex nuts on the ends of the tie rods are used to compress the manifold members and the lamination stack between the two end bells.

Figure 2:
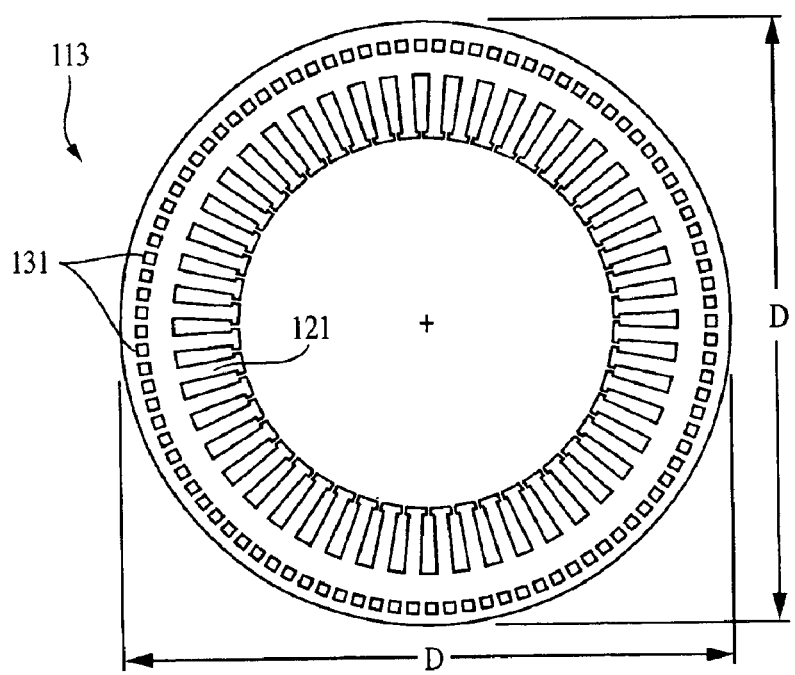
FIG. 2 is an elevational front view of a stator lamination as used in the stator depicted in FIG. 1.
Figure 3A:
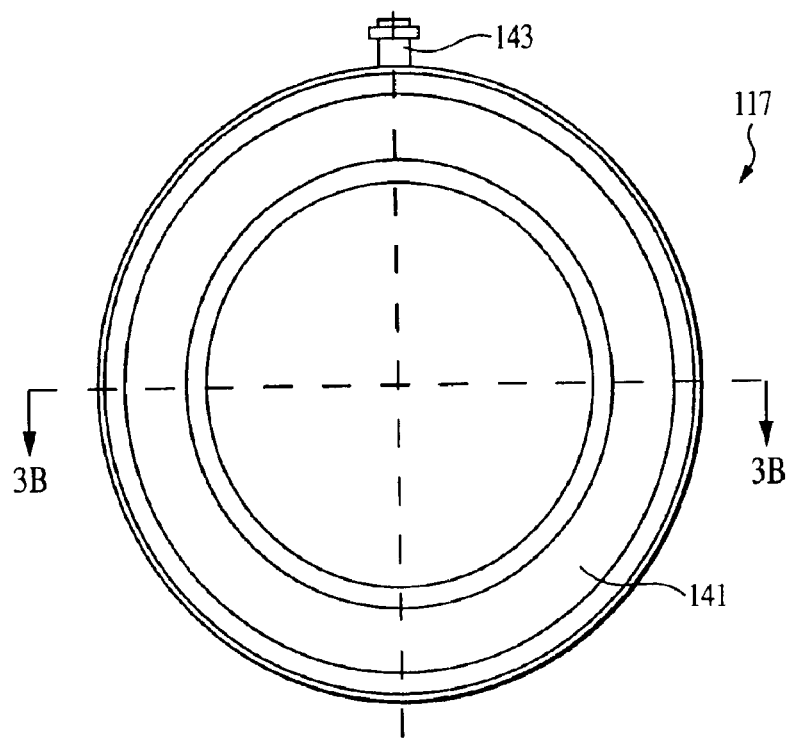
FIG. 3A is an elevational front view of a manifold member as used in the stator depicted in FIG. 1.
Figure 3B:
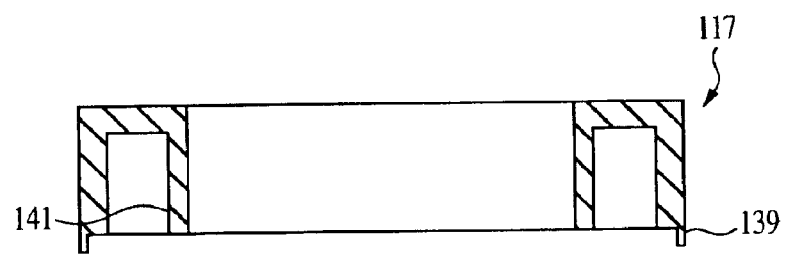
FIG. 3B is a cross-sectional plan view of the manifold member depicted in FIG. 3A.

The laminations 113 are preferably stamped from a sheet-type ferromagnetic material such as silicon steel. The lamination pattern, as depicted in FIG. 2, is similar to that of a conventional stator lamination. However, the pattern includes a plurality of apertures 131 (i.e., cutouts) formed in each lamination. Preferably the pattern has an equal number of apertures and teeth, with one aperture stationed near a base of each tooth 121.

To form the lamination stack 115, individual laminations 113 are bonded together using a heat-activated bonding agent. In doing so, the laminations are accurately aligned such that the aperture of each lamination is at least partially coincident with the apertures of adjacent laminations. The alignments of the coincident portions of the apertures define a plurality of cooling-fluid passageways 133 through the lamination stack, each such passageway extending from a first end 135 by the first manifold member 111 to a second end 137 by the second manifold member 117. The completed lamination stack is wound with either copper or aluminum wire, or bus bars, for the windings 123, preferably using conventional means.

The first and second manifolds (e.g., manifold members) 111, 117, are then adjoined to opposite ends of the lamination stack. Sealing between the manifold member and the lamination stack face can be aided by either conventional gasket techniques or by conventional O-ring techniques. The manifold members are preferably structured such that they accurately conform to and axially align with the lamination stack 115, and are thereby accurately concentric with the lamination stack along the axis 107. Preferably the manifold members have a conforming lip 139 to better receive and hold the lamination stack.

Each manifold member contains cavity walls defining at least one circumferential manifold cavity 141 that opens in the direction of the lamination stack. The circumferential cavity of each manifold member aligns with the apertures on the lamination adjoining the manifold member, placing the circumferential cavity in fluid communication with the passageways extending through the lamination stack. Each manifold member has a cooling-fluid port 143 in direct fluid communication with the circumferential cavity such that it can serve to supply cooling fluid to and/or receive cooling fluid from the passageways via the circumferential cavity. In the context of this application, a cooling fluid is understood to be a liquid, such as oil, water, or a mixture of water and ethylene glycol.

The rotor is then placed within the stator bore 145 (e.g., within the lamination stack 115 and windings 123), and the end bells 103, 105 are adjoined to opposite ends of the manifold members 111, 117. The end bells are configured to accurately conform to and align with the adjacent manifold members. The end bells receive bearings, which are typically included on either end of the rotor, thereby providing structural support for the rotor while allowing free rotation of the rotor along the axis of rotation 107.

The tie rods 125 are inserted through tabs on the end bells 103, 105 such that the tie rods each extend between the end bells. Using a tightening system such as hex nuts, the tie rods are used to draw the opposing end bells together. The end bells compress the nested manifold members 111, 117, which in turn compresses the lamination stack 115, and thus the tie rods carry a load that compresses the laminations together between the first and second manifold members. This load provides compression forces between the individual laminations, and between the lamination stack and each of the manifold members, and thus aids in maintaining seal integrity at each of the mating surfaces such that the passageways do not allow cooling fluid to leak out between the mating surfaces.

As a result of the above configuration, the stator 101 is configured for fluid flow into the port 143 of the first manifold member 111 and through its circumferential cavity 141, into and through each of the plurality of passageways 133 defined within the lamination stack 115, out into the circumferential cavity 141 of the second manifold member 117 and further out its port 143. However, even with the aid of the tie-rod compression, the lamination stack bonding agents do not necessarily provide for sealing the lamination stack such that cooling fluid cannot leak out of the passageway, passing between the laminations and out of the lamination stack.

The issue of coolant leakage is addressed by a process of treating the cooling-fluid passageways prior to use. In particular, during the process of forming the stator 101, a sealant is preferably added to cooling-fluid passageways within the stator, and particularly to the internal surfaces of the lamination-stack passageways 133. Possible sealants include a preferably heat-curable, low-viscosity epoxy, a varnish-type material, and a silicon-based material.

The sealant forms a coating that prevents leakage between adjoining laminations, and between the manifold members and the laminations that they adjoin. The sealant also provides added corrosion protection to all surfaces of the stator that come into contact with cooling fluid. Typically, the sealant is applied after stator assembly is completed by circulating the sealant along the cooling-fluid passageways, at liquid pressures and elevated temperatures as needed for the sealant to flow into all openings (e.g., cracks between laminations) and thereby seal the passageways.

In particular, in order to prevent liquid leakage between the lamination surfaces (and between the manifold members and stack faces), sealants are forced through the passageways under elevated temperatures and moderate pressures that are adequate to force the sealant to flow into openings between adjoining laminations. Preferably the sealant passes through the manifold members and the passageways, sealing and coating them as well. The sealant preferably flows into all available voids along the coolant path, and the sealant that subsequently remains in those voids become solid under "normal" temperatures and pressures. The sealant is thereby injected between the laminations of the lamination stack, forming a seal to prevent cooling fluid in the passageway from exiting the passageways and then exiting the lamination stack, between adjacent laminations.

After the sealant is injected, the stator is oriented such that the sealant is drained from the stator passageways by gravity, and/or air is forced through the stator to blow sealant from the passageways. Using one or both of these methods, enough sealant is ejected from each passageway to configure it as a sealed conduit capable of passing cooling fluid from a first end of the passageway to a second end of the passageway without cooling-fluid leakage from the lamination stack, and preferably without cooling-fluid leakage from the passageway.

Once excess sealant has been ejected from the stator (i.e., from the manifold members and the lamination passageways), the stator is preferably heated and cooled to thermally cure the sealant that is in gaps between the laminations and along the cooling-fluid contact surfaces of the passageways and the manifolds.

Figure 4:
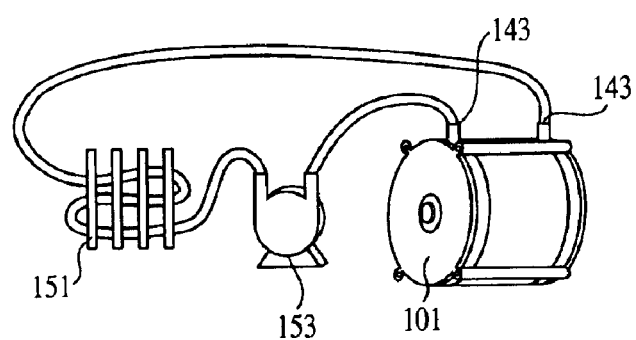
FIG. 4 is schematic view of a lamination cooling system incorporating the stator depicted in FIG. 1.

With reference to FIG. 4, the cooling-fluid ports 143 are connected such that the cooling fluid can be pumped from the stator through a heat sink 151 (e.g., an automotive radiator) by a pump 153. Thus, cooling fluid can be used to transfer heat from the stator 101 to the heat sink, to be subsequently radiated from the cooling system.

In the above-described embodiment, and in some other embodiments, the need for an outer, aluminum, cooling frame, is eliminated (or at least reduced) by modifying the stator to preferably provide both direct cooling and structural support. Preferably the cooling is direct lamination cooling.

The direct lamination cooling of these embodiments is preferably accomplished by configuring the laminations such that they define the cooling-fluid passageways to preferably extend axially through the entire lamination stack. These passageways are formed and shaped by appropriately stamping cutouts in the laminations when they are formed, thereby forming the apertures. While these apertures may be of any desired shape, rectangular apertures, which form rectangular passageways, appear to be preferable for many applications. When stacked, the lamination apertures preferably align to form axial passageways through which coolant can be directed. Preferably the design does not require additional lamination width or height over conventional designs, thus providing for lamination stacks that have material costs similar to conventional designs.

Heat transfer is therefore improved over typical designs, as the heat flow path is shortened and a thermal interface between the housing and the laminations is not required for the direct lamination cooling. The outer diameter of the resulting motor is preferably reduced to approximately that of the laminations (plus their tie rods), and the weight is reduced because the need for a conventional housing is generally eliminated.

Manifold Variations

Different configurations of manifold cavities can be used to establish different flow patterns within the lamination passageways. In the above-described embodiment, simple manifold members on each end of the lamination stack form liquid flow paths that extend through the lamination stack only once, entering at one manifold member and exiting from the other. This embodiment has omnidirectional flow, and might be characterized by cooler lamination temperatures on the inlet side than on the outlet side.

Other manifold configurations can be provided so as to cause cooling-fluid streams to flow in axially opposite directions in different passageways. Such manifolds would connect certain passageways such that a single fluid path would extend serially through more than one lamination stack passageway, axially extending through the stator two, three or even more times (i.e., through a plurality of lamination stack passageways). This use of bidirectional/contrary flow (i.e., in opposite directions), in separate passageways, can provide for more even heat distribution axially and/or circumferentially along the stator. Furthermore, the use of bidirectional flow can provide for the use of larger apertures (as compared to a similar omnidirectional flow system), while maintaining a desired fluid flow velocity through the passageways.

Figure 5A:
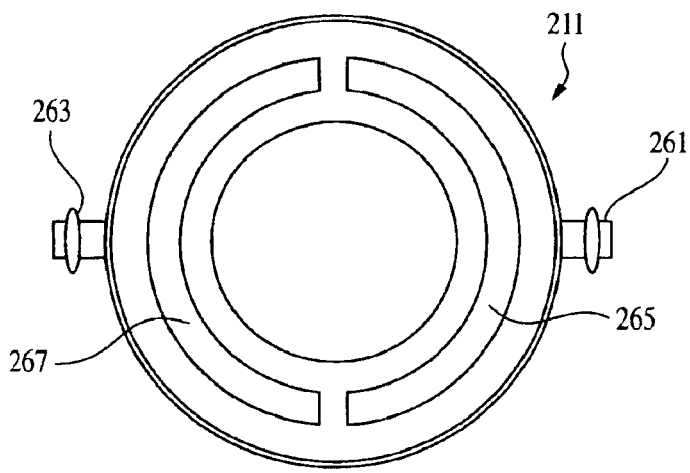
FIG. 5A is an elevational rear view of a first manifold member as used in a first variation of the stator depicted in FIG. 1.
Figure 5B:
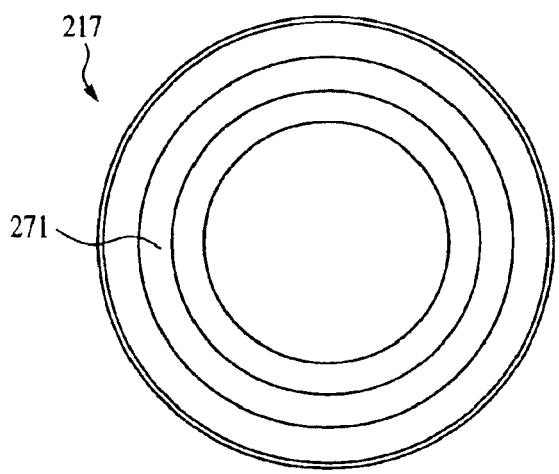
FIG. 5B is an elevational front view of a second manifold member as used in the first stator variation depicted in FIG. 5A.
Figure 5C:
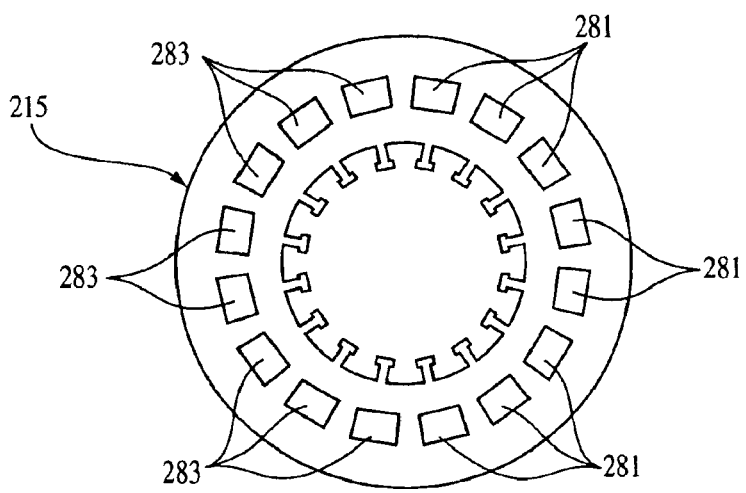
FIG. 5C is an elevational front view of a lamination stack as used in the first stator variation depicted in FIG. 5A.

With reference to FIGS. 5A–5C, a first variation of stator housing of the type described in the first embodiment can be configured for bidirectional flow. Rather than using first and second manifold members each having a cooling-fluid port and a single circumferential manifold cavity, the manifold members are configured to direct cooling fluid bidirectionally through a lamination stack 215. More particularly a first manifold member 211 is configured with a first cooling-fluid port 261, a second cooling-fluid port 263, a first semi-circumferential manifold cavity 265 and a second semi-circumferential manifold cavity 267. The first cooling-fluid port 261 is in direct fluid communication with the first semi-circumferential manifold cavity 265, and the second cooling-fluid port 263 is in direct fluid communication with the second semi-circumferential cavity 267. A second manifold member 217 is configured with a single circumferential manifold cavity 271, and no cooling-fluid port.

The lamination stack 215 has a plurality of first passageways 281 and a plurality of second passageways 283. A first end of each of the first passageways is in direct fluid communication with the first semi-circumferential cavity 265 of the first manifold member 211. Similarly, a first end of each of the second passageways is in direct fluid communication with the second semi-circumferential cavity 267 of the first manifold member 211. A second end of each of the first passageways and a second end of each of the second passageways are each in direct fluid communication with the single circumferential cavity 271 of the second manifold member 217. As a result, the cavity of the second manifold member places the plurality of first passageways in fluid communication with the plurality of second passageways.

In this variation, a cooling-fluid stream flowing in the first cooling-fluid port 261 of the first manifold member 211 will pass into the first semi-circumferential cavity 265, which will act as a manifold to separate the stream into separate streams down each of the plurality of first passageways 281. The single circumferential cavity 271 of the second manifold member 217, acts as a manifold both to rejoin the separate streams from the plurality of first passageways, and to separate the rejoined stream into separate streams down each of the plurality of second passageways 283. The second semi-circumferential cavity 267 of the first manifold member 211 acts as a manifold to rejoin the separate streams from the plurality of second passageways, directing the resulting stream out the second cooling-fluid port 263.

It is preferable to maintain a reasonably high fluid velocity through the passageways of a lamination stack. This first variation may have larger apertures than would be found in an equivalent omnidirectional embodiment. This is because the cooling fluid flowing in the first cooling-fluid port passes from the first manifold member into only half as many lamination stack passageways as would occur in an omnidirectional embodiment. Of course, in passing bidirectionally, the cooling fluid passes through twice the length of lamination stack passages. Also, since all of the first cooling-fluid passages are on one circumferential side of the stator, temperature gradients could occur both between the two circumferential sides of the stator, and axially along each circumferential side.

Figure 6A:
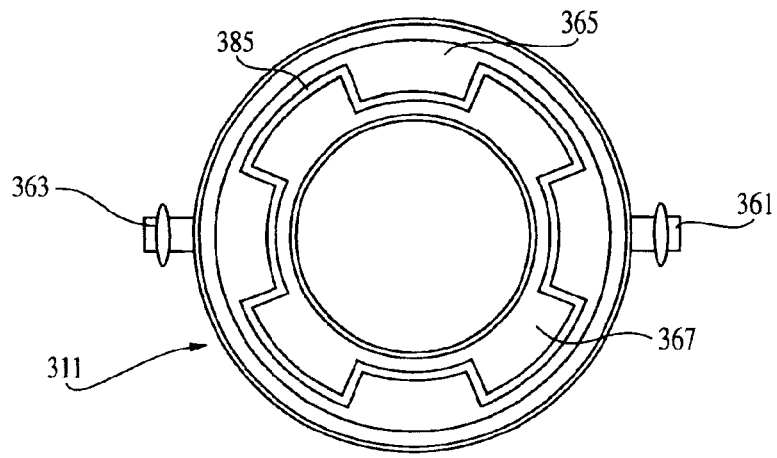
FIG. 6A is an elevational rear view of a first manifold member as used in a second variation of the stator depicted in FIG. 1.
Figure 6B:
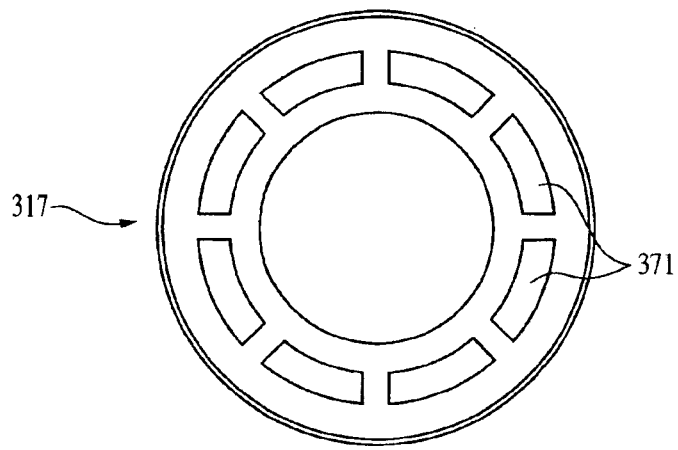
FIG. 6B is an elevational front view of a second manifold member as used in the second stator variation depicted in FIG. 6A.
Figure 6C:
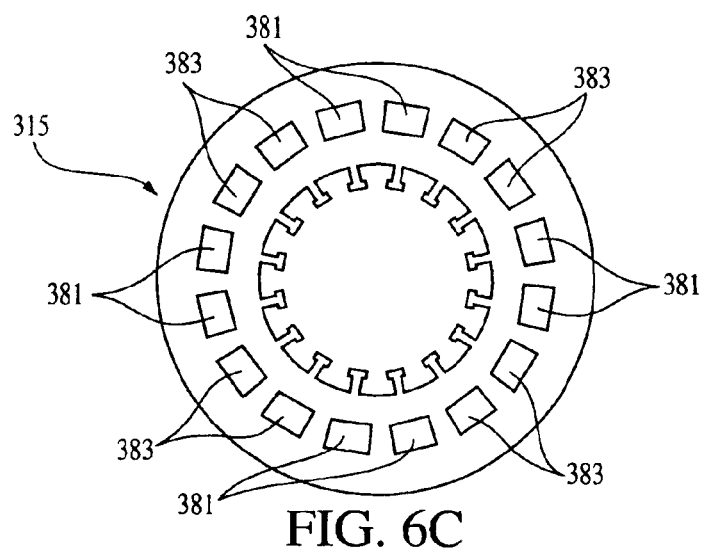
FIG. 6C is an elevational front view of a lamination stack as used in the second stator variation depicted in FIG. 6A.

With reference to FIGS. 6A–6C, a second variation of stator housing of the type described in the first embodiment can also be configured for bidirectional flow. As in the first embodiment, the manifold members are configured to direct cooling fluid bidirectionally through a lamination stack 315. More particularly a first manifold member 311 is configured with a first cooling-fluid port 361, a second cooling-fluid port 363, a first circumferential manifold cavity 365 and a second circumferential manifold cavity 367. The first cooling-fluid port 361 is in direct fluid communication with the first circumferential manifold cavity 365, and the second cooling-fluid port 363 is in direct fluid communication with the second circumferential cavity 367. A second manifold member 317 is configured with a plurality of manifold cavities 371, and no cooling-fluid port.

The lamination stack 315 has a plurality of first passageways 381 and a plurality of second passageways 383. Each first passageway has a second passageway located directly next to it on one circumferential side, and another first passageway located directly next to it on the other circumferential side. A first end of each of the first passageways is in direct fluid communication with the first circumferential cavity 365 of the first manifold member 311. Similarly, a first end of each of the second passageways is in direct fluid communication with the second circumferential cavity 367 of the first manifold member 311. This is accomplished by using an intermediate wall 385 between the first and second circumferential cavities, the intermediate wall varying in radial location around its circumference.

Each of the plurality of cavities 371 in the second manifold member 317 places a second end of one first passageway in fluid communication with a second end of one second passageway. As a result, the cavities of the second manifold member place each of the plurality of first passageways in fluid communication with one of the plurality of second passageways, each first passageway being in fluid communication with its circumferentially closest second cavity.

In this variation, a cooling-fluid stream flowing in the first cooling-fluid port 361 of the first manifold member 311 will pass into the first circumferential cavity 365, which will act as a manifold to separate the stream into separate streams down each of the plurality of first passageways 381. Each cavity 371 of the second manifold member 317, acts as a manifold to receive the stream from a first passageway, and to direct that stream into a second passageway 383. The second circumferential cavity 367 of the first manifold member 311 acts as a manifold to rejoin the separate streams from the plurality of second passageways, directing the resulting stream out the second cooling-fluid port 363.

Similar to the first variation, this second variation is characterized by larger apertures than would be found in an equivalent omnidirectional embodiment. This is because the cooling fluid flowing in the first cooling-fluid port passes from the first manifold member into only half as many lamination stack passageways as would occur in an omnidirectional embodiment. Of course, in passing bidirectionally, the cooling fluid passes through twice the length of lamination stack cooling passage. Also, since pairs of the first cooling-fluid passages are circumferentially alternated with pairs of the second cooling-fluid passages, temperature gradients are kept to a relatively low level, both circumferentially and axially along the stator.

Optionally, the cooling-fluid ports of the above variations could be located next to each other on the manifold rather than on opposite sides, as depicted. This allows for logistical advantages, but might provide less uniform heating.

Non-Axial Passageways

A third variation of the first embodiment provides for passageways that extend and/or wind in non-axial directions. Such non-axial passageways can be formed by varying the size, shape and/or location of the apertures in adjoining laminations.

Figure 7A:
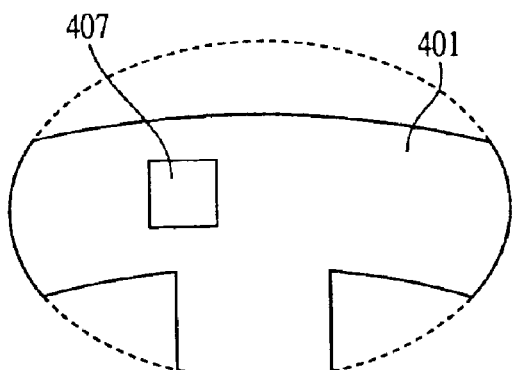
FIG. 7A is an elevational front view of a portion of a first stator lamination used to make a nonlinear cooling-fluid passageway.
Figure 7B:
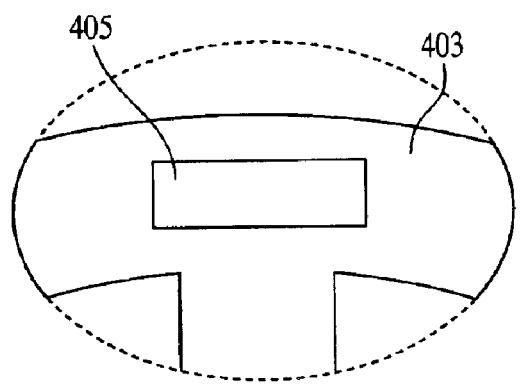
FIG. 7B is an elevational front view of a portion of a second stator lamination used to make a nonlinear cooling-fluid passageway along with the first stator lamination used to make a nonlinear cooling-fluid passageway depicted in FIG. 7A.
Figure 7C:
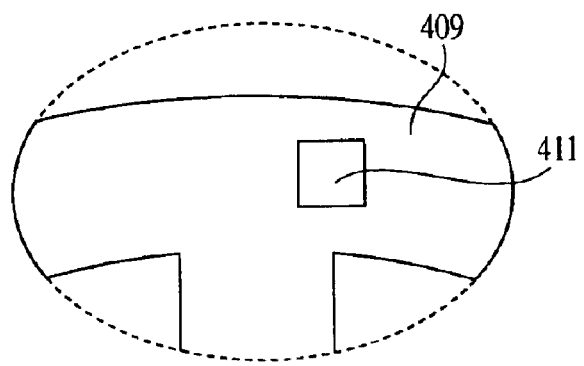
FIG. 7C is an elevational front view of a portion of a third stator lamination used to make a nonlinear cooling-fluid passageway along with the first and second stator laminations used to make a nonlinear cooling-fluid passageway depicted in FIGS. 7A and 7B.
Figure 8A:
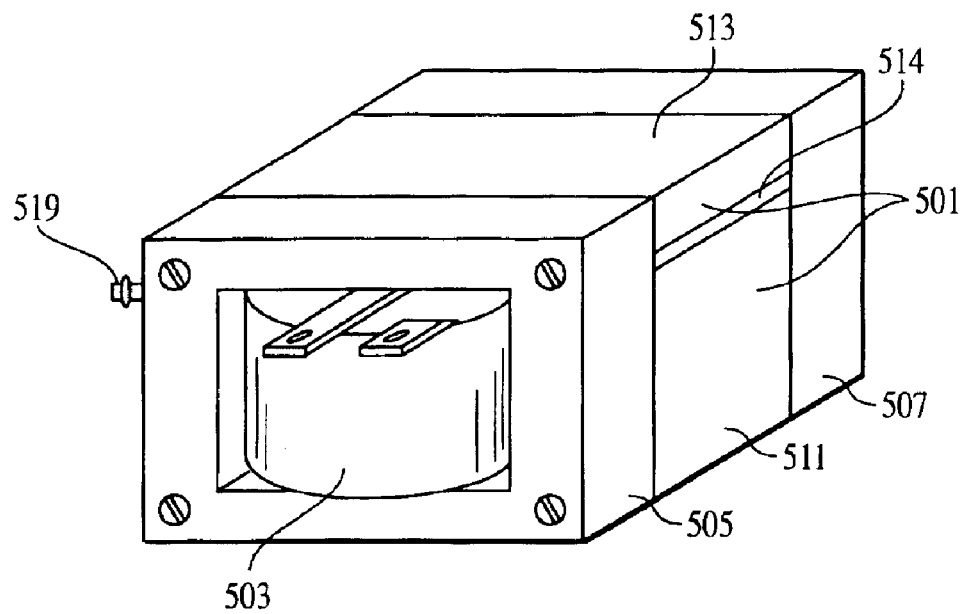
FIG. 8A is a perspective view of an inductor embodying the invention.
Figure 8B:
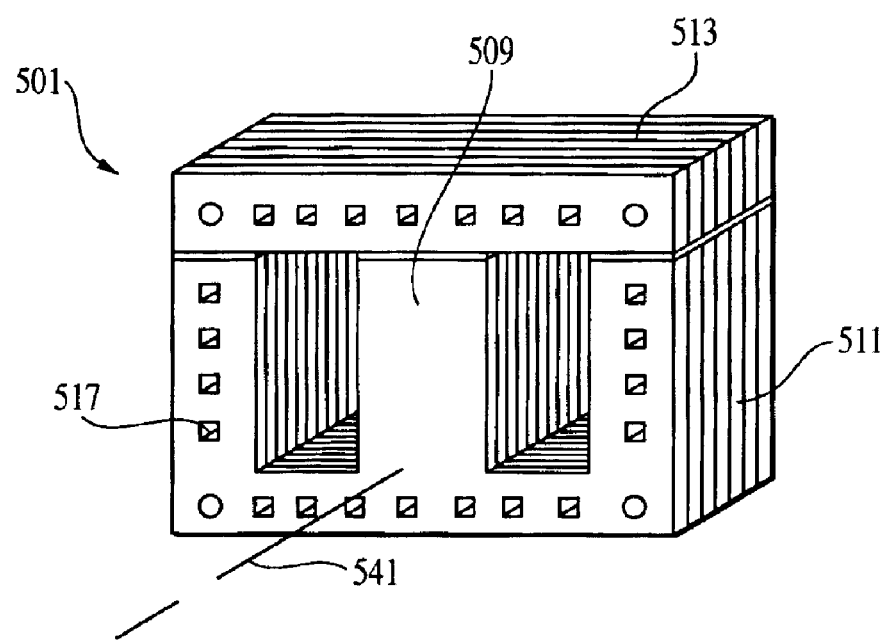
FIG. 8B is a perspective view of a core structure as used in the inductor depicted in FIG. 8A.

With reference to FIGS. 7A–7C, portions of three laminations, each portion representing an equivalent location on its lamination, are characterized by having varying aperture sizes, shapes and/or locations, to create a non-axial passageway. A group of one or more first laminations 401 having the first configuration (i.e., the configuration depicted in FIG. 7A) are preferably at a first end of a lamination stack, and are used to create axial flow along a first axial location of the lamination stack at a particular circumferential location of the stator.

A group of one or more second laminations 403 having the second configuration (i.e., the configuration depicted in FIG. 7B) adjoin the group of one or more laminations of the first configuration, creating a turn in the passageway such that the passageway extends at least partially circumferentially through a portion of the lamination stack. The turn is created because second lamination apertures 405 are significantly larger and only partially coincident with first lamination apertures 407.

A third group of one or more third laminations 409 of the third configuration (i.e., the configuration depicted in FIG. 7C) adjoins the group of one or more second laminations 403 of the second configuration, creating a second turn in the passageway such that the passageway extends axially in a second axial location of the stack, where the passageways in the first and second axial locations have different circumferential positions. The second turn is created because third lamination apertures 411 are significantly smaller and only partially coincident with second lamination apertures 405.

As a result, the passageway of the second laminations places the passageway of the first laminations in fluid communication with the passageway of the third laminations.

Additional variations in the lamination configuration can be used to further turn the passageway. For example, further groups of second and first configuration laminations can be included in the stack at additional axial locations to turn the passageway in the opposite circumferential direction from the second longitudinal location, such that a third axial location has the same passage circumferential location as the first axial location. Such a configuration effectively creates a generally axial passageway with a circumferentially offset portion.

Other variations could include spiraling passageways (e.g., laminations with partially overlapping apertures), and could even include a single lamination stack passageway configured for bidirectional flow. This last option would use two or more apertures in some laminations (forming two or more passage portions, along with preferably larger apertures in other laminations to form a manifold portion within the lamination stack that connects between the two or more passage portions formed by the two or more apertures).

Core Structures

With reference to FIGS. 8A, 8B, 9A, 9B, and 10A–10C, further embodiments of the invention are applicable for use in transformers and inductors, using core structures composed of stamped magnetic laminations that are stacked and bonded. For both transformers and inductors, the elements of such devices typically include a core structure 501, a conventional winding 503, a first manifold member 505 and a second manifold member 507.

The core structure is in an E-I configuration, with a center prong 509 of the core structure E-shaped portion forming a centerpiece to receive the winding 503. The invention can generally be applied to other typical core structures, such as "U-I" and "U—U."

As with the motor stator described above, the core structure 501 is a lamination stack comprising stacked and bonded magnetic laminations. The core structure includes an E-shaped portion 511 and a top portion 513 connected to the E-shaped portion by a spacer 514. The laminations are configured with apertures 515 that form passageways 517 in the lamination stack for a cooling fluid (i.e., a liquid).

Because of the typical need to stack and bond laminations together prior to inclusion of the winding, it may be difficult to use the "interleaved" stacking techniques that are generally used for transformer applications. Accordingly, the lamination arrangement for transformers resembles that of inductors—where stacking is not interleaved. Thus, for transformer applications, this means that magnetizing currents may be somewhat higher than with conventional designs.

Various techniques may be used to insure low thermal resistance between the winding 503 and the core 501—thus enabling the winding to operate at higher current densities than some other designs. One such technique for enhancing the thermal coupling between the winding and the core is to force aluminum shims (preferably coated with thermal grease) between the winding and the core after assembly. Another such technique is to fill voids between the core and winding with a thermally conductive resin (such as aluminum oxide filled epoxy). The combination of improved heat transfer for both the core and winding means that the size and mass of the completed transformer or inductor can be considerably smaller than with conventional air-cooled techniques.

The greatest benefits are typically in applications involving high frequencies. In these applications, magnetic flux swing must generally be restricted such that core temperatures do not become excessive. With the improved heat transfer afforded by many embodiments of the invention, larger flux swings can be tolerated. This means that both the core and winding can be smaller than would otherwise be possible.

Manifold member designs for the second embodiment resemble those of the motor embodiment described above, but are rectangular rather than round. Similar to the various embodiment variations of the motor, each manifold member 505, 507 of the inductor/transformer embodiment includes one or more cooling-fluid ports 519, and forms one or more cavities that are used as manifolds to distribute and/or receive cooling fluid to/from the passageways 517 within the core structure 501. As with the manifold members for the motor application, sealing between the manifold members and the lamination stack faces can be achieved by either conventional gasket techniques or by conventional O-ring techniques.

Figure 9A:
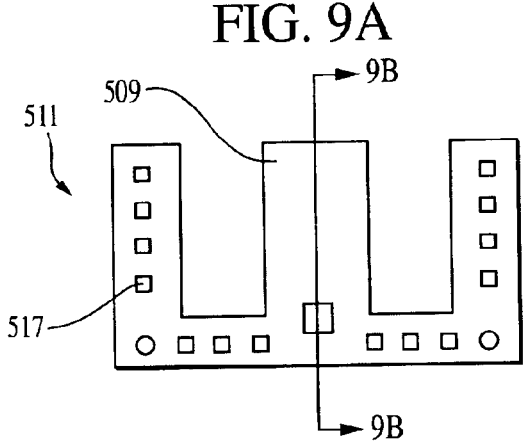
FIG. 9A is an elevational view of an E-shaped portion of the core structure depicted in FIG. 8B.
Figure 9B:
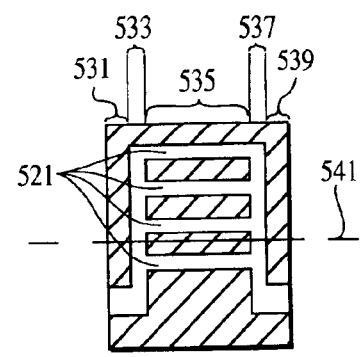
FIG. 9B is a cross section of the E-shaped portion depicted in FIG. 9A, taken along line 9B—9B of FIG. 9A.

Because it is desirable to have cooling provided to the center prong 509 of the E-shaped element, and because the windings 503 prevent direct access between the manifold members 505, 507 and center-prong passages 521 that pass through the center prong, the core 501 includes nonlinear, multithreaded, cooling-fluid passageways. More particularly, as depicted in FIG. 9B, the core includes a passageway having a first, axial portion 531, a second, non-axial, manifold portion 533, a third, multithreaded portion 535 including a plurality of the separate, parallel, center-prong passages 521, a fourth, non-axial, manifold portion 537, and a fifth, axial portion 539. Note that the terms axial and non-axial are made with reference to an axis 541 normal to the planes of the lamination stack, in a manner similar to that of the previously described embodiment.

Figure 10A:
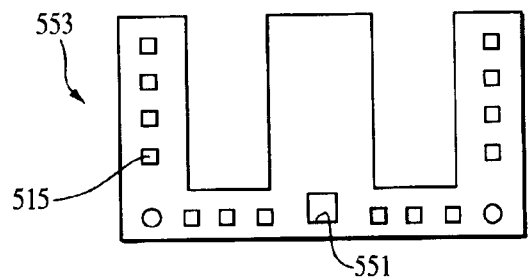
FIG. 10A is an elevational view of a first lamination used to construct the E-shaped portion depicted in FIG. 8B.
Figure 10B:
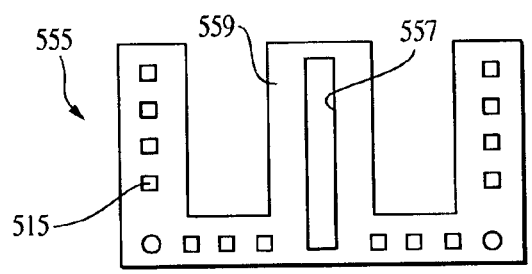
FIG. 10B is an elevational view of a second lamination used to construct the E-shaped portion depicted in FIG. 8B.
Figure 10C:
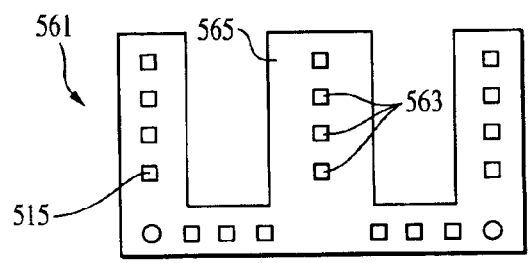
FIG. 10C is an elevational view of a third lamination used to construct the E-shaped portion depicted in FIG. 8B.

Three different lamination patterns are used to form the E-shaped portion 511 of the core 501 (see, FIGS. 10A–10C). In particular, the first, axial portion 531 of the passageway, is formed by a single aperture 551 in a first group of laminations, all being of a first lamination 553 type (see, FIG. 10A). One end of the passageway's first axial portion 531 is in direct fluid communication with a manifold cavity of the first manifold member 505.

Adjoining the first group of laminations is a second, mutually exclusive group of laminations, all being of a second lamination 555 type (see, FIG. 10B) and characterized by a large aperture 557 spanning a significant portion of a prong portion 559 of the second lamination. They are partially coincident with the apertures 551 of the first group of laminations. The large aperture forms the second, non-axial, manifold portion 533, and is in direct fluid communication with the first axial portion 531 of the first group of laminations.

Adjoining the second group of laminations is a third, mutually exclusive, group of laminations, all being of a third lamination 561 type (see, FIG. 10C) and characterized by a plurality of small apertures 563 in various portions of a prong portion 565 of the third lamination. They are partially coincident with the large apertures 557 of the second group of laminations. The plurality of small apertures form the plurality of separate, parallel center-prong passages 521 in the third, multithreaded portion 535, and are in direct fluid communication with the second, manifold portion 533 of the second group of laminations.

Adjoining the third group of laminations is a fourth, mutually exclusive, group of laminations, all being of the second lamination 555 type (see, FIG. 10B), and characterized by the large aperture 557 spanning a significant portion of the prong portion 559 of the second lamination. They are in direct fluid communication with the plurality of apertures 563 of the third group of laminations. The large aperture forms the fourth, non-axial, manifold portion 537, and is in direct fluid communication with the plurality of separate, parallel center-prong passages 521 in the third group of laminations.

Adjoining the fourth group of laminations is a fifth, mutually exclusive, group of laminations, all being of the first lamination 553 type (see, FIG. 10A) and characterized by the single aperture 551. The aperture forms the fifth, axial portion 539, and is in direct fluid communication both with the fourth, non-axial, manifold portion 537, and with a manifold cavity of the second manifold member 507.

As in the first embodiment, the issue of coolant leakage is further addressed by a process of treating the cooling-fluid passageways with a sealant prior to use. The methods of injecting, removing and curing sealant, and the composition of the sealant, are similar to those described above. Furthermore, the use of a pump and a heat sink is envisaged as similar to that described above with respect to the first embodiment.

This configuration is similar to the non-axial passageways described above for the first embodiment, but it is multithreaded, including multiple, parallel, offset portions. Effectively, a first of the center-prong passages 521 could be considered part of the primary passageway, while the remaining of the center-prong passages 521 could be considered secondary passages that are in fluid communication with the primary passageway at two axial locations.

These two offset-type aspects of the invention are applicable to a wide range of embodiments. Indeed, they would be particularly appropriate for use in other types of lamination devices, such as a rotor that comprises laminations, and their use in other lamination devices is envisioned within the scope of the invention.

Applications

Various embodiments of the invention are applicable for use in transformers, inductors, motors, generators, and various other electrical and electrotechnical devices. Preferably, embodiments provide lamination cooling systems, cooled devices, vehicles and other apparatus using such systems and devices. Preferably, embodiments also provide methods of forming lamination cooling systems and cooled devices, and other related methods. Preferably, embodiments are characterized by low manufacturing costs, and low size and mass, as compared with conventional designs, while maintaining similar or better performance levels. Such benefits will likely translate into higher power densities, higher specific power, and/or lower manufacturing costs for electric and hybrid electric vehicles, as well as other devices using above-described lamination cooling systems.

In the preferred embodiments, heat transfer is expected to improve significantly as compared with framed motors. The elimination of the housing-to-lamination interface is anticipated to reduce this component of thermal impedance, while fluid to fin heat transfer is not expected to change. However, thermal gradients within the lamination material itself are expected to be less in at least some embodiments, due to reduced characteristic heat flow distances.

The outside diameter of a stator is anticipated to be smaller than for an equivalent framed stator due to the lack of a frame. Likewise, weight reduction is anticipated, albeit it might be partially offset by some additional mass in material for laminations, tie rods and end bells.

The manufacturing costs of a motor of the invention are anticipated to be lower, as compared to a comparable conventional electric motor, include costs associated with the housing, and costs associated with the precision machining of the stator and the interference assembly of the stator and housing. This cost savings might be partially offset by costs associated with tie rods, manifold members, assembly, and the application of the sealant. There are also some potential indirect cost reductions, including the lower mass and reduced dimensions of the motor, which can translate into lower overall vehicle costs.

While a particular form of the invention is illustrated and described, it will be apparent that various modifications can be made without departing from the spirit and scope of the invention. For example, the manifold member can form a closed cavity with orifices configured for joining in fluid communication with the passageways, or it can be an open sided manifold (see, e.g., FIG. 3A) sealed against the lamination stack.

Although the invention is described in detail with reference only to the preferred embodiments, those having ordinary skill in the art will appreciate that various modifications can be made, and variations in benefits and costs will occur, without departing from the invention.

We claim:

1. A lamination cooling system comprising a lamination stack including a plurality of laminations, each lamination defining an aperture, wherein the aperture of each lamination is at least partially coincident with the apertures of adjacent laminations such that the apertures define a cooling-fluid passageway through the lamination stack, and wherein gaps between the adjacent laminations are sealed to prevent a liquid cooling fluid in the passageway from exiting the lamination stack between adjacent laminations wherein the laminations are planar, and wherein the apertures of some adjacent laminations are only partially coincident such that the passageway extends in one or more directions that are not normal to the plane of the laminations.

2. The lamination cooling system of claim 1, wherein gaps between the adjacent laminations are sealed to prevent a liquid cooling fluid from exiting the passageway between the adjacent laminations.

3. The lamination cooling system of claim 1, wherein the gaps between the adjacent laminations are sealed with a sealant applied internally to walls of the passageways.

4. The lamination cooling system of claim 3, wherein the sealant is a heat-cured sealant.

5. The lamination cooling system of claim 3, wherein the sealant is a heat-cured, low-viscosity epoxy.

6. The lamination cooling system of claim 1, wherein lamination apertures are configured such that the passageway includes:
a first portion normal to the plane of the laminations;
a second portion normal to the plane of the laminations, the second portion being offset from the first portion; and
a third portion that is not normal to the plane of the laminations, the third portion placing the first portion and the second portion in fluid communication.

7. The lamination cooling system of claim 1, wherein the lamination stack is configured for bidirectional flow.

8. The lamination cooling system of claim 1, and further including cooling fluid, wherein the cooling fluid is a fluid selected from the group of oil, water, and a mixture of water and ethylene glycol.

9. An electric motor, comprising the lamination cooling system of claim 1.

10. A transformer, comprising the lamination cooling system of claim 1.

11. An inductor, comprising the lamination cooling system of claim 1.

12. A lamination cooling system comprising a lamination stack including a plurality of laminations, each lamination defining an aperture, wherein the aperture of each lamination is at least partially coincident with the apertures of adjacent laminations such that the apertures define a first cooling-fluid passageway through the lamination stack, and wherein gaps between the adjacent laminations are sealed to prevent a liquid cooling fluid in the passageway from exiting the lamination stack between adjacent laminations, wherein:
the plurality of laminations includes mutually exclusive first and second groups of laminations, the first group of laminations adjoining the second group of laminations;
each lamination of the second group of laminations further defines a second aperture;
within the second group of laminations, the second aperture of each lamination is at least partially coincident with the second apertures of adjacent laminations such that the second apertures define a second cooling-fluid passageway extending through the second group of laminations;
the sealed gaps between the adjacent laminations are sealed to prevent a liquid cooling fluid in the second passageway from exiting the lamination stack between adjacent laminations;
a first portion of the first passageway extends through the first group of laminations and a second portion of the first passageway extends through the second group of laminations; and
the first portion of the first passageway is in direct fluid communication with the second passageway.

13. The lamination cooling system of claim 12, wherein:
the plurality of laminations further includes a third group of laminations that are mutually exclusive from the first and second groups of laminations, the third group of laminations adjoining the second group of laminations;
a third portion of the first passageway extends through the third group of laminations; and
the third portion of the first passageway is in direct fluid communication with the second passageway.

14. A lamination cooling system comprising a lamination stack including a plurality of laminations, each lamination defining an aperture, wherein the aperture of each lamination is at least partially coincident with the apertures of adjacent laminations such that the apertures define a first cooling-fluid passageway through the lamination stack, and wherein gaps between the adjacent laminations are sealed to prevent a liquid cooling fluid in the passageway from exiting the lamination stack between adjacent laminations, wherein each lamination defines a second aperture, wherein the second aperture of each lamination is at least partially coincident with the second apertures of adjacent laminations such that the second apertures define a second cooling-fluid passageway through the lamination stack, and wherein gaps between the adjacent laminations are sealed to prevent a liquid cooling fluid in the second passageway from exiting the lamination stack between adjacent laminations.

15. The lamination cooling system of claim 14, and further comprising a manifold member adjoining the lamination stack, the manifold member being configured to place a first end of the first passageway and a first end of the second passageway in fluid communication with a first cooling-fluid port.

16. The lamination cooling system of claim 15, and further comprising a second manifold member adjoining the lamination stack, the second manifold member being configured to place a second end of the first passageway and a second end of the second passageway in fluid communication with a second cooling-fluid port.

17. The lamination cooling system of claim 16, wherein the first and second manifold members are on opposing ends of the stack of laminations, and wherein the laminations are compressed together by the first and second manifold members.

18. The lamination cooling system of claim 17, and further comprising at least one rod, the rod carrying a load that compresses the laminations together between the first and second manifold members.

19. The lamination cooling system of claim 14, and further comprising a first manifold member adjoining the lamination stack at a first end and a second manifold member adjoining the lamination stack at a second end, wherein:

the first manifold member is configured to place a first end of the first passageway in fluid communication with a first cooling-fluid port on the first manifold member;

the first manifold member is configured to place a first end of the second passageway in fluid communication with a second cooling-fluid port on the first manifold member; and the second manifold member is configured to place a second end of the first passageway in fluid communication with a second end of the second passageway.

* * * * *